United States Patent
Ishihara et al.

(10) Patent No.: US 11,346,291 B2
(45) Date of Patent: May 31, 2022

(54) THROTTLE VALVE DEVICE

(71) Applicants: DENSO DAISHIN CORPORATION, Tokoname (JP); DENSO CORPORATION, Kariya (JP)

(72) Inventors: Kenichi Ishihara, Tokoname (JP); Tohru Shimizu, Tokoname (JP)

(73) Assignees: DENSO DAISHIN CORPORATION, Tokoname (JP); DENSO CORPORATION, Kariya (JP)

( * ) Notice: Subject to any disclaimer, the term of this patent is extended or adjusted under 35 U.S.C. 154(b) by 124 days.

(21) Appl. No.: 16/992,189

(22) Filed: Aug. 13, 2020

(65) Prior Publication Data

US 2021/0054791 A1   Feb. 25, 2021

(30) Foreign Application Priority Data

Aug. 19, 2019 (JP) .............................. JP2019-149923

(51) Int. Cl.
*F16K 1/22* (2006.01)
*F02D 9/10* (2006.01)
*F16K 31/04* (2006.01)

(52) U.S. Cl.
CPC .......... *F02D 9/1065* (2013.01); *F16K 31/041* (2013.01); *F16K 1/221* (2013.01)

(58) Field of Classification Search
USPC ................................................ 251/305, 308
See application file for complete search history.

(56) References Cited

U.S. PATENT DOCUMENTS

| 4,938,452 | A | * | 7/1990 | Imamura | F02D 9/106 251/305 |
| 6,263,898 | B1 | * | 7/2001 | Vanderveen | F02D 9/02 137/15.25 |
| 2002/0171059 | A1 | * | 11/2002 | Sakurai | F02D 11/10 251/305 |
| 2005/0028871 | A1 | * | 2/2005 | Kurita | F16K 37/0041 137/554 |
| 2006/0157027 | A1 | * | 7/2006 | Ichikawa | F02D 9/105 123/399 |
| 2013/0284147 | A1 | * | 10/2013 | Nicholas | F02D 9/1065 123/319 |
| 2017/0284310 | A1 | * | 10/2017 | Delplanque | F02M 26/54 |

FOREIGN PATENT DOCUMENTS

JP      2003-120335 A   4/2003

* cited by examiner

*Primary Examiner* — Robert K Arundale
(74) *Attorney, Agent, or Firm* — Harness, Dickey & Pierce, P.L.C.

(57) ABSTRACT

A throttle valve device includes a body, a shaft, a pair of bearings, a valve, a motor, a valve gear, a coil spring, a first guide, and a second guide. At least one of the first guide and the second guide includes a circular holder that faces an end surface of the coil spring, a spring-end holding portion that outwardly protrudes from the circular holder and is configured to hold a spring end of the coil spring, a hub that is rotatably connected to the shaft, and a connecting portion that connects the hub and the circular holder. The first guide is in contact with a lever only at an end surface of the hub. The second guide is in contact with one of the pair of bearings, which is located close to the valve gear, at an end surface of the hub.

9 Claims, 7 Drawing Sheets

<OPENING DEGREE-TORQUE CHARACTERISTIC>

FIG. 19C

THROTTLE VALVE DEVICE

CROSS REFERENCE TO RELATED APPLICATIONS

This application is a non-provisional application, which claims the benefit of priority from Japanese Patent Application No. 2019-149923 filed on Aug. 19, 2019. The entire disclosure of all of the above application is incorporated herein by reference.

TECHNICAL FIELD

The present disclosure relates to a throttle valve device that may be used as, for example, an electronic throttle device for controlling intake air of an engine, an EGR valve used in an exhaust gas circulation system, an intake passage pressure control valve for a diesel engine, and a negative pressure control valve for controlling a hydrogen concentration of a fuel cell. More specifically, the present disclosure relates to a throttle valve device that holds a valve at a slightly opened position (hereinafter, this position is referred to as a "valve intermediate open position"), rather than at a fully closed position where the valve is fully closed by a coil spring that biases the valve.

BACKGROUND

For example, in an electronic throttle device, when the motor of the electronic throttle device does not generate a driving force, the throttle valve is operated to stop at the valve intermediate open position, rather than at a fully closed position to close the intake passage, so that the vehicle can perform an evacuation travel even if some failure occurs in an engine control unit that controls an operating condition of the engine or in the electronic throttle.

SUMMARY

In one aspect of the present disclosure, a throttle valve device includes a body, a shaft, a pair of bearings, a valve, a motor, a valve gear, a coil spring, a first guide, and a second guide. The body defines therein a passage and a motor space. The shaft extends in the passage of the body in a direction perpendicular to the passage. The pair of bearings are disposed on both sides of the passage of the body and the pair of bearings rotatably support the shaft. The valve rotates together with the shaft to selectively open and close the passage. The motor is disposed in the motor space of the body. The motor rotates in response to an electric signal. The valve gear is disposed coaxial with the shaft in the body. The valve gear is connected to the shaft via a lever so that the valve gear transmits rotation of the motor to the shaft. The coil spring is disposed between the valve gear and the valve in the body. The coil spring applies a biasing force when the rotation of the motor is transmitted to the shaft. The first guide that covers one side of the coil spring. The second guide covers the other side of the coil spring. At least one of the first guide and the second guide includes a circular holder that faces an end surface of the coil spring, a spring-end holding portion that outwardly protrudes from the circular holder and is configured to hold a spring end of the coil spring, a hub that is rotatably connected to the shaft, and a connecting portion that connects the hub and the circular holder. The first guide is in contact with the lever only at an end surface of the hub when the at least one of the first guide and the second guide is the first guide. The second guide is in contact with one of the pair of bearings, which is located close to the valve gear, at an end surface of the hub when the at least one of the first guide and the second guide is the second guide.

BRIEF DESCRIPTION OF THE DRAWINGS

The disclosure, together with additional objectives, features and advantages thereof, will be best understood from the following description, the appended claims and the accompanying drawings.

DETAILED DESCRIPTION

To begin with, a relevant technology will be described only for understanding the following embodiments. In an electronic throttle device, a coil spring is used, and resin-made guides are arranged at both ends of the coil spring. When the throttle valve is rotated from the valve intermediate open position to the fully closed position, one of the two resin-made guides serves as a stopper and the other of the two resin-made guides rotates together with the coil spring. On the other hand, when the throttle valve is rotated from the valve intermediate open position to the fully open position, the other of the two guides serves as a stopper while the one of the two guides rotates together with the coil spring.

However, in the above-described electronic throttle device, either one of the two guides slides on the body or the valve gear when the throttle valve rotates. Therefore, the resistance due to the sliding brings about a large hysteresis, and therefore it is difficult to accurately control rotation of the throttle valve in an opening direction or a closing direction across the valve intermediate open position.

In view of the above, one objective of the present disclosure is to reduce sliding resistance of a resin-made guide with respect to a body and a valve gear when the guide rotates.

As described above, in a first aspect of the present disclosure, a throttle valve device includes a body, a shaft, a pair of bearings, a valve, a motor, a valve gear, a coil spring, a first guide, and a second guide. The body defines therein a passage and a motor space. The shaft extends in the passage of the body in a direction perpendicular to the passage. The pair of bearings are disposed on both sides of the passage of the body and the pair of bearings rotatably support the shaft. The valve rotates together with the shaft to selectively open and close the passage. The motor is disposed in the motor space of the body. The motor rotates in response to an electric signal. The valve gear is disposed coaxial with the shaft in the body. The valve gear is connected to the shaft via a lever so that the valve gear transmits rotation of the motor to the shaft. The coil spring is disposed between the valve gear and the valve in the body. The coil spring applies a biasing force when the rotation of the motor is transmitted to the shaft. The first guide that covers one side of the coil spring. The second guide covers the other side of the coil spring. At least one of the first guide and the second guide includes a circular holder that faces an end surface of the coil spring, a spring-end holding portion that outwardly protrudes from the circular holder and is configured to hold a spring end of the coil spring, a hub that is rotatably connected to the shaft, and a connecting portion that connects the hub and the circular holder. The first guide is in contact with the lever only at an end surface of the hub when the at least one of the first guide and the second guide is the first guide. The second guide is in contact with one of the pair of bearings, which is located close to the valve gear, at an end surface of the hub when the at least one of the first guide and the second guide is the second guide.

Accordingly, it is possible to reduce a contact area between the coil spring and the guide when the guide rotates.

In a second aspect of the present disclosure, the connecting portion of the at least one of the first guide and the second guide has a thickness in an axial direction that is less than that of the hub and the circular holder such that a space is defined by the connecting portion, the hub, and the circular holder.

As a result, a part of at least one of the valve gear and the body can be housed in the inside space, and thus the throttle valve device can be downsized.

In a third aspect of the present disclosure, the connecting portion and the hub form a T-shape in a cross-section.

In a fourth aspect of the present disclosure, the connecting portion and the hub form an L-shape in a cross-section.

In a fifth aspect of the present disclosure, the at least one of the first guide and the second guide is the first guide, and the hub of the first guide is tapered toward the lever.

Accordingly, the contact area between the first guide and the lever can be reduced.

In a sixth aspect of the present disclosure, the at least one of the first guide and the second guide is the second guide, and the hub of the second guide is tapered toward the one of the pair of bearings.

Accordingly, the contact area between the second guide and the bearing can be reduced.

In a seventh aspect of the present disclosure, the connecting portion has a disc shape and includes a radial rib that is formed on an outer surface of the connecting portion.

Accordingly, the strength of the connecting portion can be increased.

In an eighth aspect of the present disclosure, the at least one of the first guide and the second guide are the first guide and the second guide, and a specific gap is formed between the hub of the first guide and the hub of the second guide.

Therefore, the sliding resistance between the first guide and the second guide can be eliminated.

In a ninth aspect of the present disclosure, the first guide and the second guide have a same shape.

As a result, the assembly time can be shortened, the assembling facility cost can be reduced, and the component costs can be reduced.

Next, an embodiment in which the present disclosure is applied to an electronic throttle device will be described below with reference to the drawings. As described above, the throttle valve device of the present disclosure can be widely used as a throttle valve device such as an EGR valve, a diesel engine intake passage pressure control valve, and a fuel cell negative pressure control valve. Therefore, the names of the throttle shaft, the throttle valve and the like are used because the present invention is applied to the electronic throttle device, but the uses of the shaft and the valve are not necessarily limited to the throttle.

Figure 1:
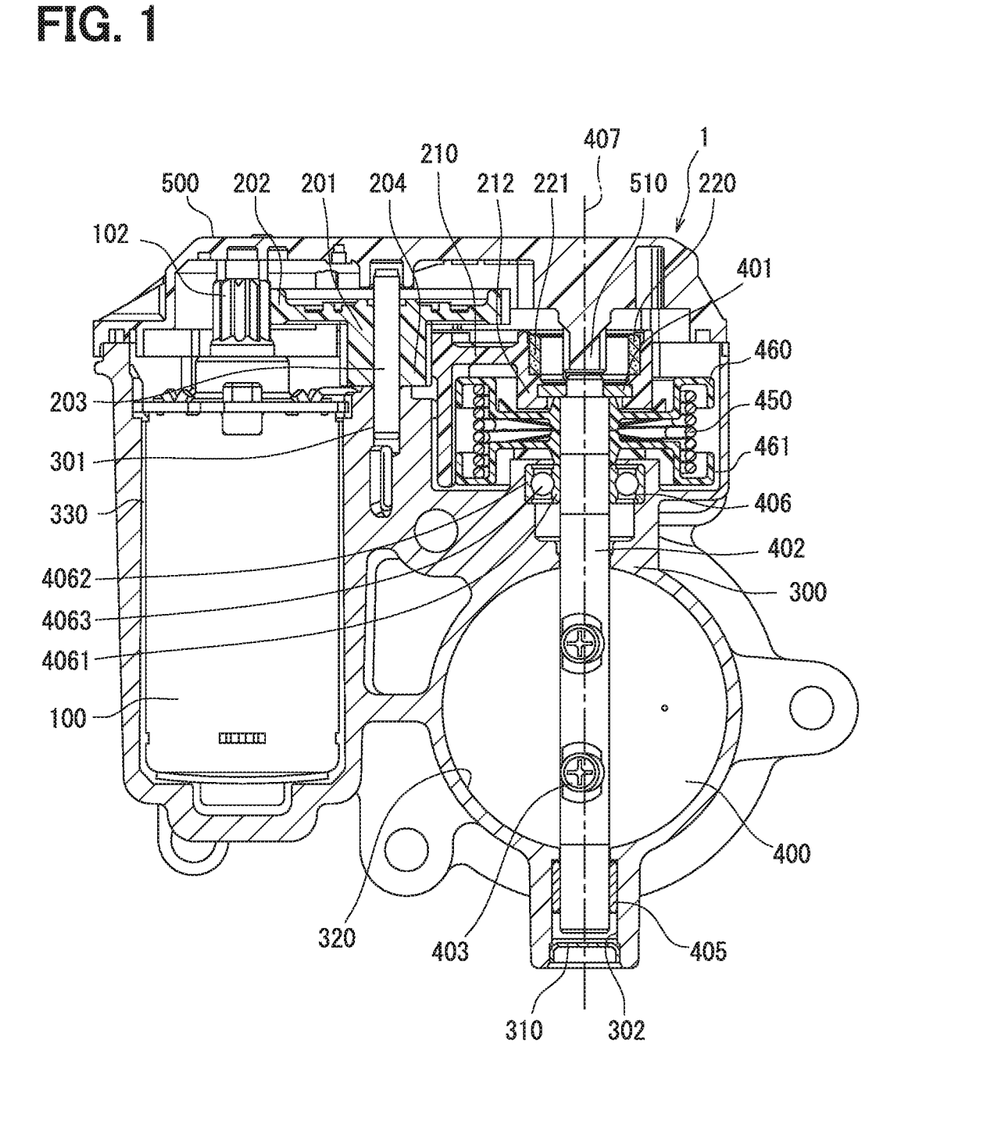
FIG. 1 is a vertical cross-sectional view of an electronic throttle.

FIG. 1 is a vertical cross-sectional view of the electronic throttle device. An outline of the electronic throttle device 1 will be described with reference to FIG. 1. The electronic throttle device 1 is arranged in an engine compartment and controls a flow rate of an intake air taken into an engine. An engine control unit (not shown) calculates an optimum intake amount in accordance with a drivers accelerator pedal operation, an engine rotation state, and the like, and outputs a rotational amount according to the calculation results to the motor 100.

Figure 2:
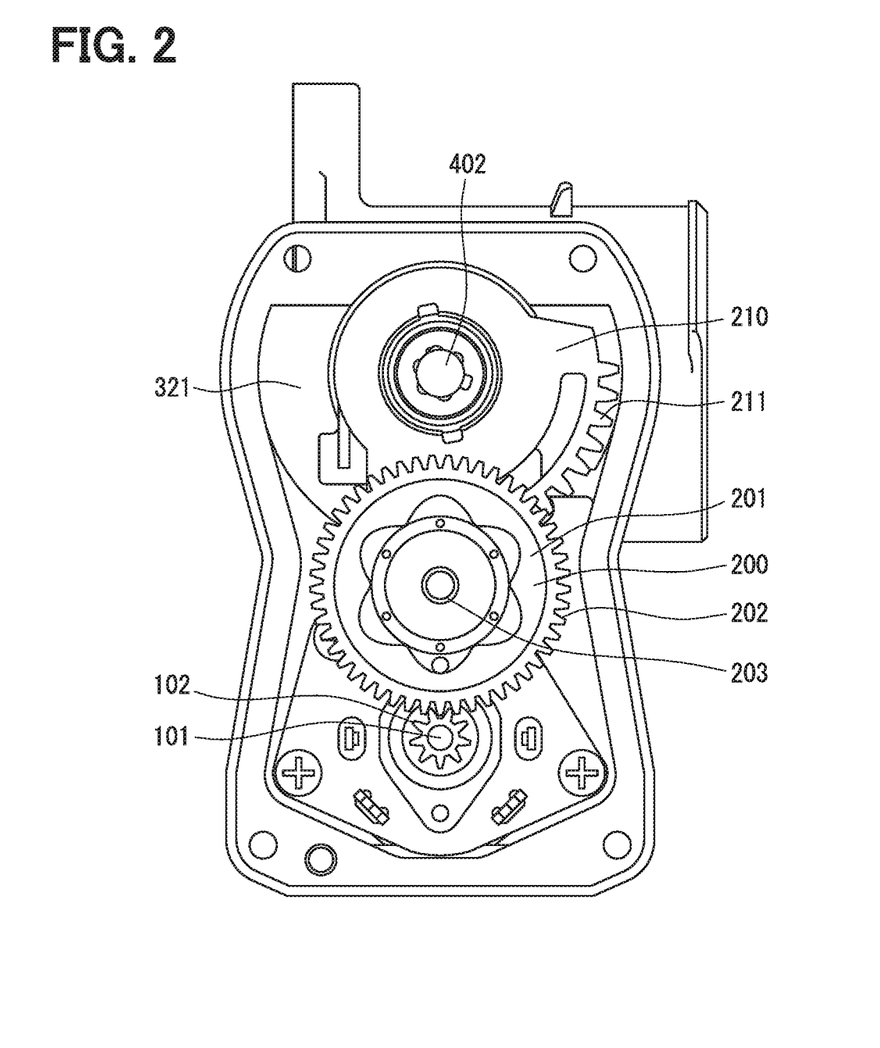
FIG. 2 is a front view of a body.

The motor 100 is disposed in a motor space 330 of a body 300, and the rotation of the motor 100 is transmitted to a reduction mechanism 200 via a pinion 102 that is press-fitted and fixed to a motor shaft 101. As shown in FIG. 2, in the reduction mechanism 200, a large-diameter gear portion 202 of an intermediate gear 201 meshes with the motor pinion 102. The intermediate gear 201 is held to be rotatable about an intermediate shaft 203. The intermediate shaft 203 is press-fitted and fixed into a fitting hole 301 of the body 300.

A small-diameter gear portion 204 of the intermediate gear 201 meshes with tooth portions 211 formed in an arc shape on an outer circumferential surface of the valve gear 210, and the rotation of the motor pinion 102 is transmitted to the valve gear 210 via the intermediate gear 201. Therefore, the reduction mechanism 200 includes the motor pinion 102, the large-diameter gear portion 202 and the small-diameter gear portion 204 of the intermediate gear 201, and the tooth portions 211 of the valve gear 210. The reduction rate is that when the motor shaft 101 rotates 28 times, one tooth portion 211 of the valve gear 210 advances clockwise or counterclockwise.

Semicircular arc-shaped magnets 220 and 221 are arranged in an inner circumference of a cup-shaped center portion 212 of the valve gear 210, and the magnets 220 and 221 form a magnetic circuit. A disk-shaped lever 401 is disposed in a deep portion (the lower side in FIG. 1) of the cup-shaped center portion 212 of the valve gear 210. The magnets 220 and 221 and the lever 401 are insert-molded with the valve gear 210.

The lever 401 is fixed to an end of the throttle shaft 402 by swaging. Therefore, the valve gear 210 is connected to the throttle shaft 402 via the lever 401, and rotation of the valve gear 210 is transmitted to the throttle shaft 402. A disc-shaped throttle valve 400 is fixed to the throttle shaft 402 by screws 403, and the throttle valve 400 increases or decreases the opening area of an intake passage 320 formed in the body 300 in accordance with the rotation thereof.

An open end 303 (the upper side in FIG. 1) of the body 300 is covered with a cover 500. The cover 500 is formed of a resin such as polybutyl terephthalate, and ribs are formed at specified locations to increase its strength. A pair of rotation angle sensors 510, which are Hall ICs, are disposed in the cover 500 at positions corresponding to an axis 407 of the throttle shaft 402. The rotation angle sensor 510 is fixed to the cover 500. However, the pair of arc-shaped magnets 220 and 221, which are insert-molded with the valve gear 210, are disposed on an outer circumference of the rotation angle sensor 510. Then, the magnets 220, 221 rotate around the axis 407 in accordance with the rotation of the throttle shaft 402. Accordingly, the magnetic circuit is moved to a position corresponding to the rotation angle of the throttle valve 400. The rotation angle sensor 510 detects the change in the magnetic force caused by the position change in the magnetic circuit, and thus detects an opening degree of the throttle valve 400. Then, the detected position information is fed back to an engine control unit (not shown).

The throttle shaft 402 is rotatably supported in the body 300 by bearings 405 and 406 disposed on both sides of the throttle valve 400. The bearing 405 is a plain bearing, and the bearing 406 is a ball bearing. An opening 302 of the body 300 for the throttle shaft 402 is an opening for the bearing 405 to be inserted and is covered by the plug 310.

Figure 3:
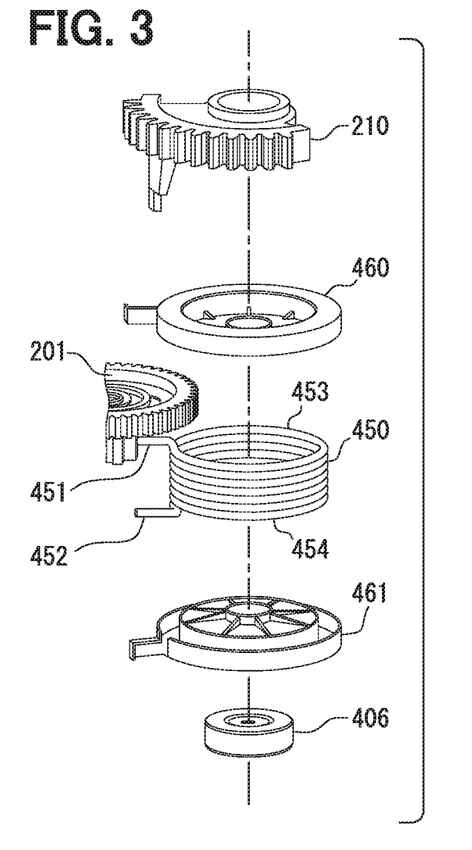
FIG. 3 is a perspective view showing a coil spring and first and second guides.

A space 321 for housing the valve gear 210 is formed in the body 300, and a coil spring 450 for urging the throttle shaft 402 is disposed in this space 321. As shown in FIG. 3, the coil spring 450 has a cylindrical shape, and both ends 451, 452 thereof are bent and protrude radially outward.

Figure 4:
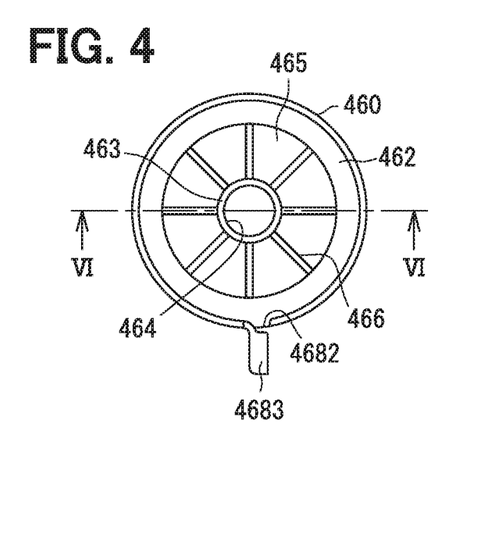
FIG. 4 is a front view of a first guide.
Figure 5:
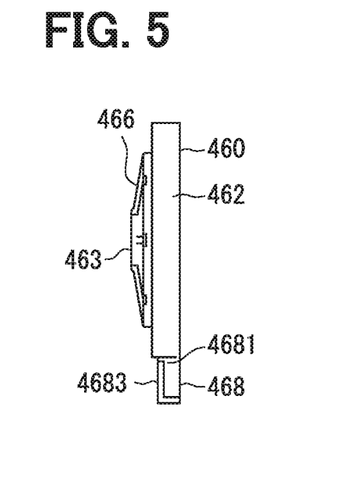
FIG. 5 is a side view of the first guide shown in FIG. 4.

FIG. 4 is a front view of the first guide 460, and FIG. 5 is a side view of the first guide 460. As shown in FIGS. 4 and 5, a circular holder 462 is formed in the first guide 460 to have a corresponding shape of the coil spring 450. One end surface 453 of the coil spring 450 is housed in the holder 462. The first guide 460 has a hub 463 formed in the center thereof, and the throttle shaft 402 is loosely fitted into a center hole 464 of the hub 463. In other words, the first guide 460 is disposed rotatably about the throttle shaft 402.

Figure 6:
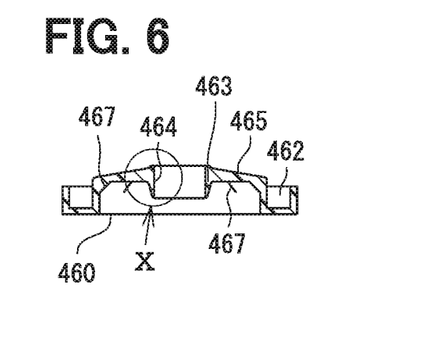
FIG. 6 is a cross-sectional view taken along line VI-VI in FIG. 4.
Figure 7:
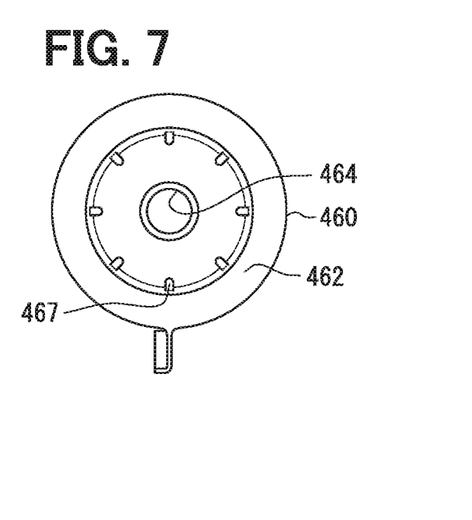
FIG. 7 is a rear view of the first guide shown in FIG. 4.

The hub 463 and the holder 462 of the first guide 460 are connected by a disc-shaped connecting portion 465. Ribs 466 and 467 for increasing strength are formed on both surfaces of the connecting portion 465. As shown in FIG. 4, eight ribs 466 on one surface of the connecting portion 465 are formed over the entire length in the radial direction from the hub 463 to the holder 462. The ribs 466 are at intervals of 45 degrees in the circumferential direction. As shown in FIGS. 6 and 7, eight ribs 467 on the other surface of the connecting portion 465 are only formed around the holder 462. The ribs 467 are at intervals of 45 degrees in the circumferential direction. FIG. 6 is a cross-sectional view taken along line VI-VI of FIG. 4, but is shown upside down in relation to FIG. 1.

A spring-end holding portion 468 is formed to radially protrude from the circular holder 462 of the first guide 460. The spring-end holding portion 468 includes a holding surface 4681 that is in contact with the spring end 451, a hole 4682 through which the spring end 451 is inserted, and a protector 4683 that covers the spring end 451. The hole 4682 improves an assembling process of the coil spring 450, and the protector 4683 prevents the coil spring 450 from falling off.

Figure 8:
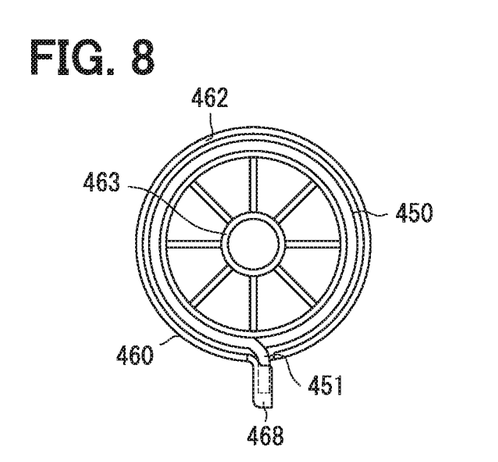
FIG. 8 is a front view of the coil spring disposed in the first guide.
Figure 9:
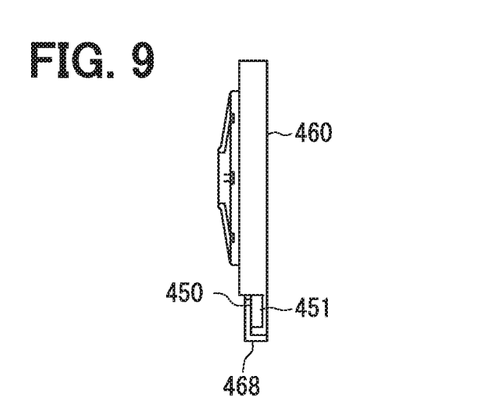
FIG. 9 is a side view of the first guide shown in FIG. 8.

FIGS. 8 and 9 show a portion of the coil spring 450 that is arranged in the circular holder 462 and the spring-end holding portion 468 of the first guide 450. In this state, the spring end 451 is engaged with the first guide 460, but at the same time, the spring end 452 is also engaged with the second guide 461. Under this condition, the coil spring 450 is preloaded. By the preload, the spring end 451 is pressed against the holding surface 4681.

Figure 10:
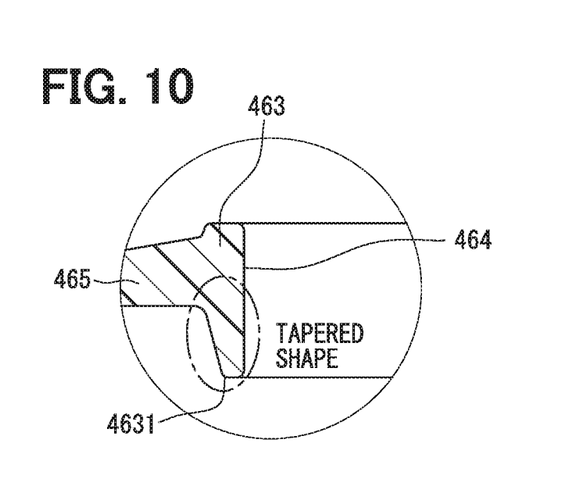
FIG. 10 is an enlarged view of portion X in FIG. 6.

FIG. 10 is an enlarged view of X portion in FIG. 6. As shown in FIG. 10, the hub 463 is tapered toward an outside (the lower side in FIG. 19). The width of the hub 463 has a minimum value at an outermost portion 4631. Further, since the outermost portion 4631 has a corner with a curved surface, the substantial width thereof is further reduced.

The above-description is regarding the first guide 460, but since the second guide 461 has the same shape as the first guide 460, the description of the first guide 460 can be applied to the second guide 461. Also in the relationship between FIG. 6 and FIG. 1, the first guide 460 has been described based on FIG. 6, but the second guide 461 has the same shape as shown in FIG. 1.

In this way, by forming the first guide 460 and the second guide 461 to have the same shape, it is not necessary to classify the first guide 460 and the second guide 461 at the time of assembling, and as a result, assembling time can be reduced. In addition, by having the same shape, the cost of an assembling equipment can be reduced and the cost of components can be reduced.

However, the second guide 461 is used in an opposite direction with respect to the first guide 460. Therefore, as shown in FIG. 3, the circular holder 462 of the first guide 460 houses and holds the one end surface 453 of the coil spring 450, while the circular holder portion 462 of the second guide 461 houses and holds the other end surface 454 the coil spring 450.

As shown in FIG. 1, the first guide 460, the coil spring 450, and the second guide 461 are arranged around the throttle shaft 402 on a back side (the lower side in FIG. 1) of the valve gear 210. Then, the outermost portion 4631 of the hub 463 of the first guide 460 is brought into contact with the metal-made lever 401, and the outermost portion 4631 of the hub 463 of the second guide 461 is brought into contact with an inner race 4061 (see FIG. 1) of the ball bearing 406. It should be noted that 4062 indicates an outer race of the ball bearing, and 4063 indicates a ball in the drawings.

As will be described later, the body 300 is formed with a spring receiver that is in contact with the spring-end holding portion 468 of the first guide 460 and the spring-end holding portion 468 of the second guide 461 to receive the spring force of the coil spring 450. Then, when each of the spring-end holding portions 468 is in contact with the respective spring receiver, the throttle valve 400 keeps the intake passage 320 at a valve intermediate open state by the biasing force of the coil spring 450. Although this intermediate valve open state is in a closed position, the throttle valve 400 does not fully close the intake passage 320 so as to allow an evacuation travel in the event of occurrence of a failure. That is, the intake passage 320 is slightly open so that a predetermined amount of intake air can flow into the intake passage 320.

Figure 11:
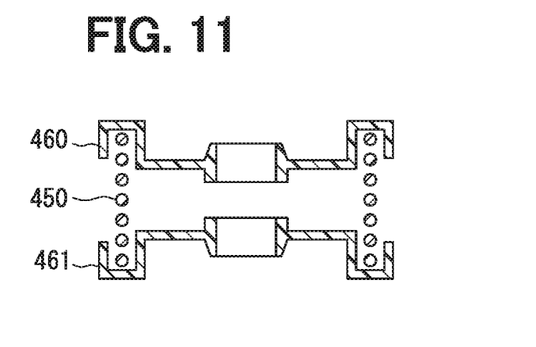
FIG. 11 is a cross-sectional view of the first and second guides before assembled.

Next, an assembling process of the coil spring 450 will be described. When the coil spring 450 is not preloaded, the first guide 460 and the second guide 461 are substantially separated away from each other by the coil spring 450, as shown in FIG. 11. Even in the state of FIG. 11, the circular holder 462 of the first guide 460 houses the one end surface 453 of the coil spring 450, while the spring-end holding portion 468 holds the spring end 451. Further, the circular holder 462 of the second guide 461 houses the other end surface 454 of the coil spring 450, while the spring-end holding portion 468 holds the spring end 452.

Figure 12:
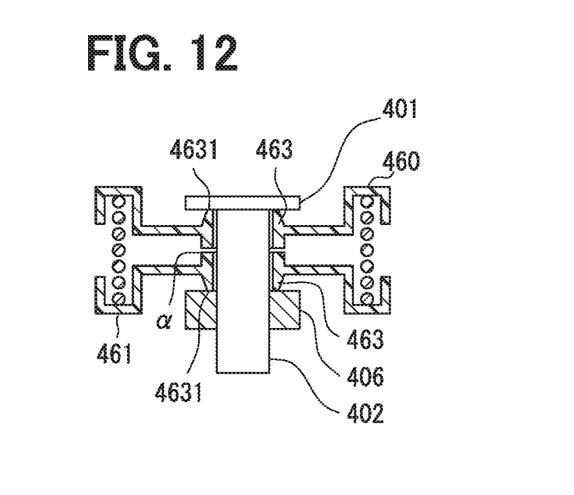
FIG. 12 is a cross-sectional view of the first and second guides after assembled.

From this state, a preload is applied to the coil spring 450 so that the spring-end holding portion 468 of the first guide 460 is brought into contact with the spring receiver of the valve gear 210 and the spring-end holding portion 468 of the second guide 461 is brought into contact with the spring receiver of the body 300. In this state, as shown in FIG. 12, a gap between the first guide 460 and the second guide 461 is narrowed. However, in this example, even if the gap is narrowed by the pressure of the coil spring 450, a specific gap a can be still formed between the hub 463 of the first guide 460 and the hub 463 of the second guide 461.

Therefore, the contact by the first guide 460 and the contact by the second guide 461 in an assembled state are only the contact between the outermost portion 4631 of the hub 463 of the first guide 460 and the metal-made lever 401 and the contact between the outermost portion 4631 of the hub 463 of the second guide 461 and the inner race 4061 of the ball bearing 406. Therefore, as described below, a sliding resistance generated during rotation is drastically reduced.

When the throttle valve 400 opens the intake passage 320 in order to increase the engine speed, the one end 451 of the coil spring 450 is kept at a position, while the other end 452 thereof moves in accordance with the rotation of the throttle shaft 402. In response to this movement, the coil spring 450 applies a returning force to the throttle shaft 402, the valve gear 210, and eventually the motor 100.

Therefore, when the valve is rotated from the intermediate open position to the fully open position, the first guide 460 does not rotate, and only the second guide 461 rotates. As a result, a relative position change occurs between the first guide 460 that does not rotate and the throttle shaft 402 that rotates. However, the sliding along the axial direction of the throttle shaft 402 due to the position change of the first guide 460 is done only between the outermost portion 4631 of the hub 463 and the metal-made lever 401, and therefore the contact area for sliding becomes extremely small. This applies to the rotation of the throttle valve 400 when the throttle valve 400 returns from the fully open position to the valve intermediate open position.

On the other hand, when the throttle valve 402 closes the intake passage 320 to have the engine in an idling state, the throttle shaft 402 rotates from the valve intermediate open position to the fully closed position. In this case, the other end 452 of the coil spring 450 is kept at a position, and the one end 451 moves in accordance with the rotation of the throttle shaft 402, contrary to the fully opening process as described above. Then, the coil spring 450 applies an opening force to the throttle shaft 402, the valve gear 210, and eventually the motor 100 in accordance with this movement.

Similar to the fully opening situation, the position change relative to the throttle shaft 402 occurs in the guide that is kept at a position, and in this case, the second guide 461. The sliding along the axial direction of the throttle shaft 402 in accordance with the change in the position of the second guide 461 during the relative rotation is done between the outermost portion 4631 of the hub 463 of the second guide 461 and the inner race 4061 of the ball bearing 406. Also in this case, the contact area during the sliding is extremely small. This relative position change is the same when the throttle valve 402 returns from the fully closed position to the valve intermediate open position.

Figure 16:
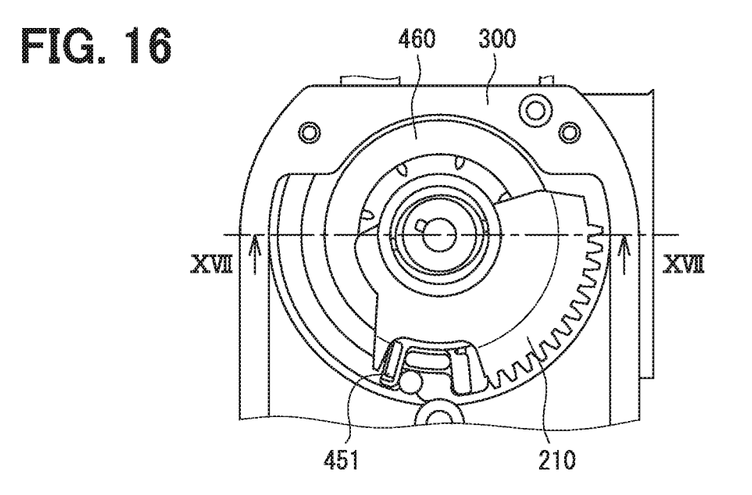
FIG. 16 is a front view showing a valve gear of FIG. 2.
Figure 17:
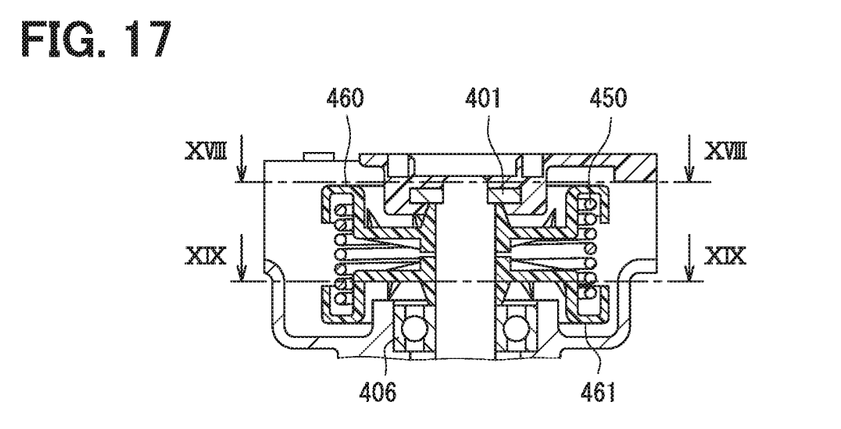
FIG. 17 is a cross-sectional view taken along line XVII-XVII in FIG. 16.
Figure 18A:
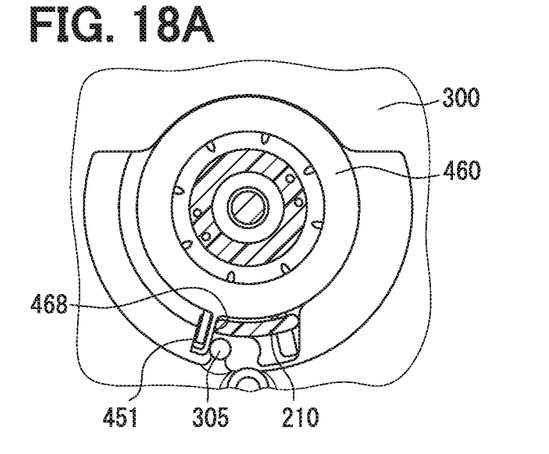
FIG. 18A is a cross-sectional view taken along line XVIII-XVIII of FIG. 17 at a valve intermediate open position.

This movement will be described with reference to FIGS. 16 to 19. FIG. 16 shows a portion of the valve gear 210 in FIG. 2 at a position of the valve intermediate open position. FIG. 17 is a cross-sectional view taken along line XVII-XVII in FIG. 16, and FIGS. 18 and 19 are cross-sectional views taken along line XVIII-XVIII and XIX-XIX in FIG. 17. FIGS. 18A and 19A show the valve intermediate open position, FIGS. 18B and 19B show the fully closed position, and FIGS. 18C and 19C show the fully open position.

Figure 18B:
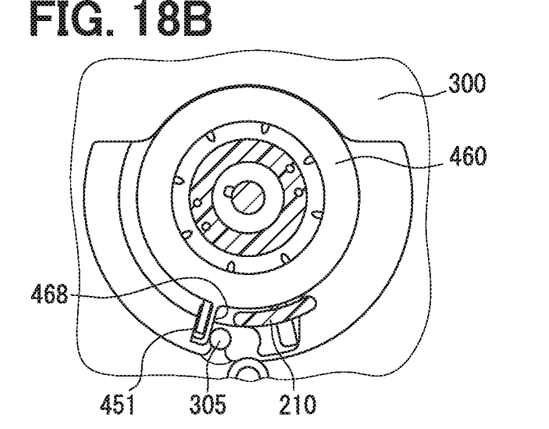
FIG. 18B is a cross-sectional view taken along line XVIII-XVIII of FIG. 17 at a fully closed position.
Figure 18C:
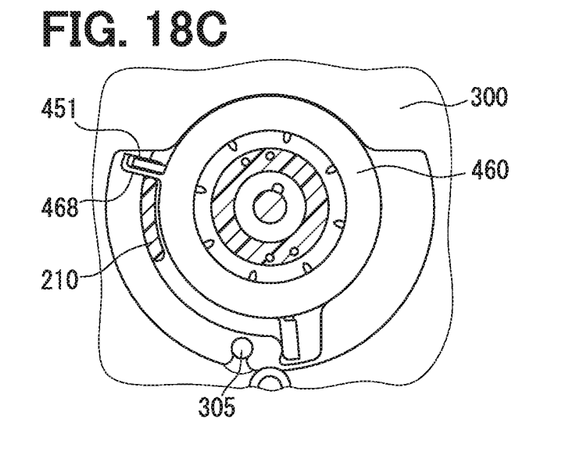
FIG. 18C is a cross-sectional view taken along line XVIII-XVIII of FIG. 17 at a fully open position.
Figure 19A:
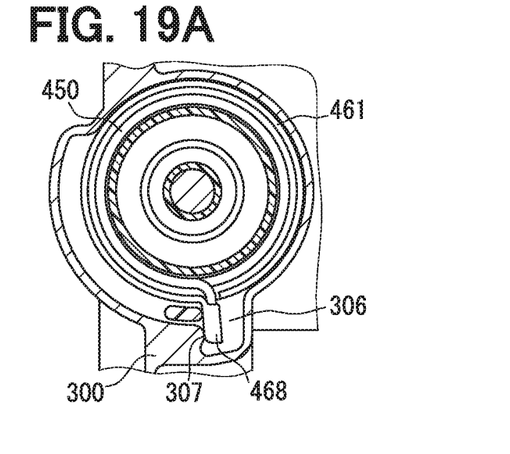
FIG. 19A is a cross-sectional view taken along XIX-XIX in FIG. 17 at the valve intermediate open position.

As shown in FIGS. 18A and 18B, the spring-end holding portion 468 of the first guide 460 that holds the spring end 451 is in contact with a locking pin 305 of the body 300, and the valve gear 210 simply separates away from the spring-end holding portion 468 during a time period between the valve intermediate open position (FIG. 18A) and the fully closed position (FIG. 18B). On the contrary, the spring-end holding portion 468 moves in the clockwise direction by the valve gear 210 during a time period from the valve intermediate open position (FIG. 18A) to the fully open position (FIG. 18C).

Figure 19B:
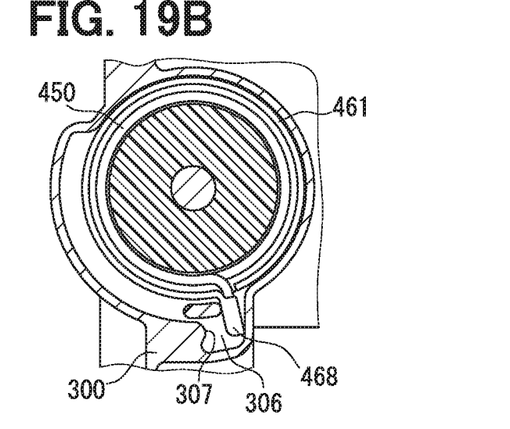
FIG. 19B is a cross-sectional view taken along XIX-XIX in FIG. 17 at the fully closed position.
Figure 19C:
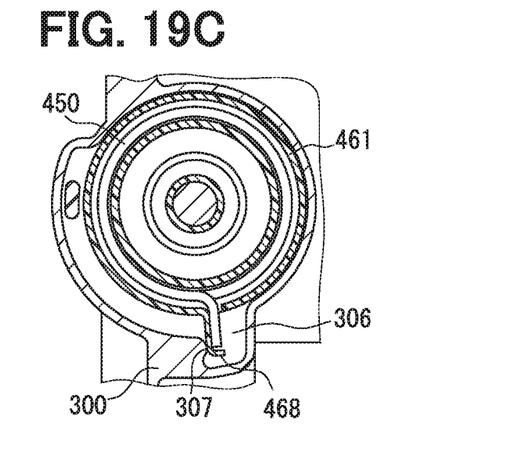
FIG. 19C is a cross-sectional view taken along XIX-XIX in FIG. 17 at the fully open position.

The movement of the second guide 461 is shown in FIGS. 19A and 19B. The spring-end holding portion 468 that holds the spring end 452 moves in the counterclockwise direction inside a movement groove 306 of the body 300 in accordance with the rotation of the valve gear 210 during a time period between the valve intermediate open position (FIG. 19A) and the fully closed position (FIG. 19B). On the other hand, the spring-end holding portion 468 is kept engaged with a locking end 307 which is one end of the movement groove 306 of the body 300 during a time period from the valve intermediate open position (FIG. 19A) to the fully open position (FIG. 19C). Thus, the spring-end holding portion 468 does not move.

As described above, according to the present embodiment, when the throttle valve 402 is rotated against the biasing force of the coil spring 450 toward the fully open position from the valve intermediate open position as a center position and when the throttle valve 402 is rotated with the biasing force of the coil spring 450 toward the valve intermediate open position from the fully open position, sliding is done only with a small contact area between the outermost portion 4631 of the hub 463 of the first guide 460 and the metal lever 401. On the contrary, when the throttle valve 402 is rotated against the biasing force of the coil spring 450 toward the fully closed position from the valve intermediate open position and when the throttle valve 402 is rotated with the biasing force of the coil spring 450 toward the valve intermediate open position from the fully closed position, sliding is done only with a small contact area between the outermost portion 4631 of the hub 463 of the second guide 461 and the inner race 1061.

Figure 13:
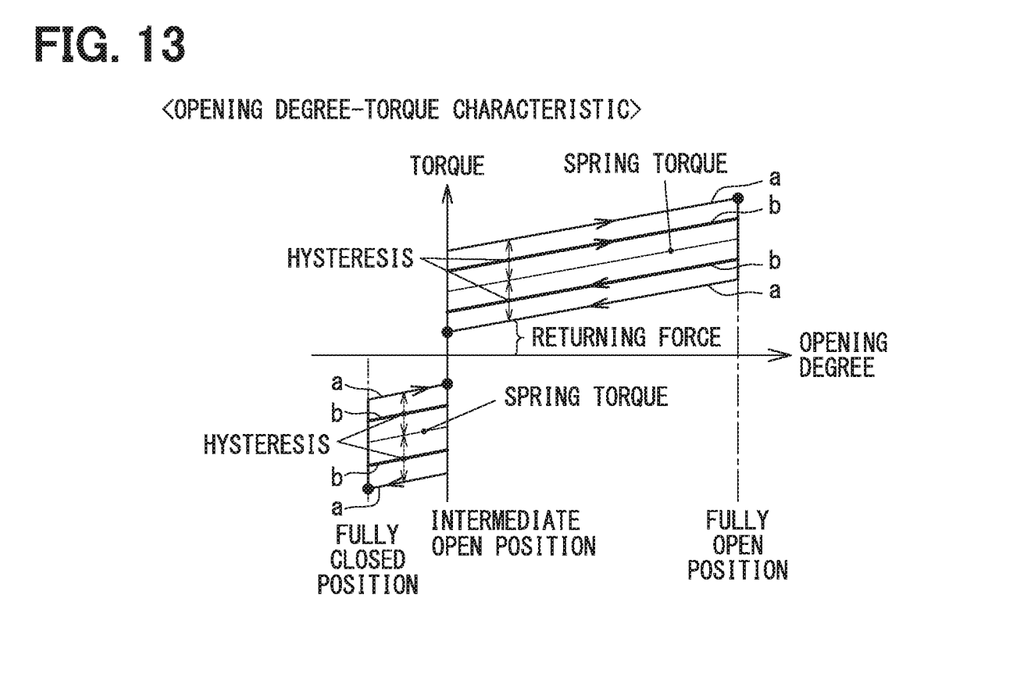
FIG. 13 is a diagram showing hysteresis.

In particular, since sliding by both the guides 460 and 461 is done at the respective hub 463, the sliding is made with a minimum radius, and the sliding torque due to the sliding resistance can be also minimized. In addition, since the lever 401 and the inner race 4061 are made of dense metal, the coefficient of friction is small, and the sliding resistance for the guides 460 and 461 that are made of resin can be further reduced. Therefore, as shown in FIG. 13, the hysteresis is significantly reduced. Note that, in FIG. 13, "a" indicates a hysteresis of a comparative structure in which the resin guide slides in full contact with the body 300 and the valve gear 210, and "b" indicates a hysteresis of this embodiment.

Although the bearing 406 is a ball bearing in this embodiment, the bearing 406 may be a sliding bearing similar to the bearing 405. Even in that case, the coefficient of friction is small and the sliding resistance for the second guide 461 is also small. Alternatively, the sliding bearing may be made of sintered metal impregnated with lubricating oil.

Further, in this embodiment, the spring end 452 of the coil spring 450 close to the second guide 461 moves during the rotation from the valve intermediate open position to the fully open position, and the spring end 451 close to the first guide 460 moves during the rotation from the valve intermediate open position to the fully closed position. However, the operation of the coil spring 450 may be reversed. Although the rotation of the motor 100 is reversed, the operation is the same as this embodiment. As can be seen from FIG. 13, the amount of rotation of the throttle shaft 402 is greater when the throttle valve 403 rotates from the valve intermediate open position to the fully open position than when from the valve intermediate open position to the fully closed position. The friction coefficient of the bearing 406 is smaller than that of the lever 401. Therefore, the hysteresis reduction effect can be further enhanced by having the spring end 452 of the coil spring 450 close to the second guide 461 move when rotating from the valve intermediate open position to the fully open position.

Figure 14:
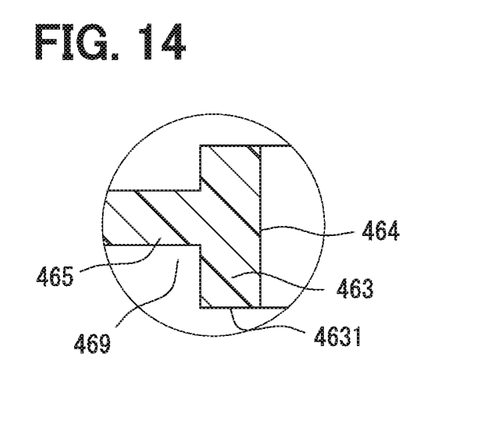
FIG. 14 is a cross-sectional view of a guide according to a modification.
Figure 15:
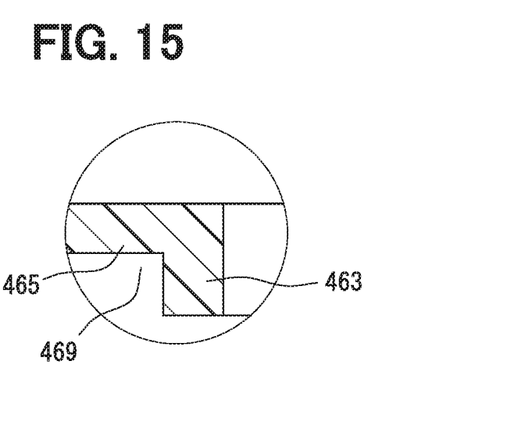
FIG. 15 is a cross-sectional view of a guide according to another modification.

Although the above-described embodiment is a preferred embodiment, the shape of the hub 463 can be variously changed. It may be T-shaped as shown in FIG. 14 or L-shaped as shown in FIG. 15. Since the space 469 is formed between the hub 463 and the connecting portion 465 regardless of whether the hub 463 is T-shaped or L-shaped, the axial length of the throttle shaft 402 of the electronic throttle device 1 can be reduced by effectively utilizing the space 469 to house the protruding portion of the body 300 or the valve gear 210 therein.

Further, in the above-described example, the minute gap a is formed between the first guide 460 and the second guide 461. However, when the hubs 463 of both guides 460 and 461 come into contact with each other due to an assembling error, such a slight contact may be acceptable.

Further, in the above example, the first guide 460 and the second guide 461 have the same shape to reduce a total time of assembling process, the assembly facility cost, and the component costs. However, if it is necessary to make the shapes of the first guide 460 and the second guide 461 different from each other because of the shape of the valve gear 210 or the body 300, it is inevitable to allow the shape change. In that case, it is inevitable that one of the first guide 460 and the second guide 461 comes into contact at a minimum with the body 300 or the valve gear 210 at a position other than the hub 463. Further, in the above example, the connecting portion has a disc shape, but may have another shape.

What is claimed is:

1. A throttle valve device, comprising: a body that defines therein a passage and a motor space;
a shaft that extends in the passage of the body in a direction perpendicular to the passage; a pair of bearings that are disposed on both sides of the passage of the body, the pair of bearings rotatably supporting the shaft; a valve that rotates together with the shaft to selectively open and close the passage; a motor that is disposed in the motor space of the body, the motor rotating in response to an electric signal; a valve gear that is disposed coaxial with the shaft in the body, the valve gear being connected to the shaft via a lever so that the valve gear transmits rotation of the motor to the shaft; a coil spring that is disposed between the valve gear and the valve in the body, the coil spring applying a biasing force when the rotation of the motor is transmitted to the shaft; a first guide that covers one side of the coil spring; and a second guide that covers the other side of the coil spring, wherein at least one of the first guide and the second guide includes: a circular holder that faces an end surface of the coil spring; a spring-end holding portion that outwardly protrudes from the circular holder and is configured to hold a spring end of the coil spring; a hub that is rotatably connected to the shaft; and a connecting portion that connects the hub and the circular holder, wherein the first guide is in contact with the lever only at an end surface of the hub when the at least one of the first guide and the second guide is the first guide, and the second guide is in contact with one of the pair of bearings at an end surface of the hub when the at least one of the first guide and the second guide is the second guide.

2. The throttle valve device according to claim 1, wherein the connecting portion of the at least one of the first guide and the second guide has a thickness in an axial direction that is less than a thickness of the hub and the circular holder such that a space is defined by the connecting portion, the hub, and the circular holder.

3. The throttle valve device according to claim 2, wherein the connecting portion and the hub form a T-shape in a cross-section.

4. The throttle valve device according to claim 2, wherein the connecting portion and the hub form an L-shape in a cross-section.

5. The throttle valve device according to claim 1, wherein the at least one of the first guide and the second guide is the first guide, and
the hub of the first guide is tapered toward the lever.

6. The throttle valve device according to claim 1, wherein the at least one of the first guide and the second guide is the second guide, and
the hub of the second guide is tapered toward the one of the pair of bearings.

7. The throttle valve device according to claim 1, wherein the connecting portion has a disc shape and includes a radial rib that is formed on an outer surface of the connecting portion.

8. The throttle valve device according to claim 1, wherein the at least one of the first guide and the second guide are the first guide and the second guide, and
a specific gap is formed between the hub of the first guide and the hub of the second guide.

9. The throttle valve device according to claim 1, wherein the first guide and the second guide have a same shape.

* * * * *